United States Patent
Guo

[11] Patent Number: 6,044,891
[45] Date of Patent: Apr. 4, 2000

[54] VEHICLE CURTAIN

[76] Inventor: Hongshi Guo, 7317 Park Village Rd., San Diego, Calif. 92129

[21] Appl. No.: 08/993,838

[22] Filed: Dec. 18, 1997

[51] Int. Cl.[7] .......................................................... B60J 3/00
[52] U.S. Cl. ............................... 160/370.21; 160/DIG. 13
[58] Field of Search ..................................... 160/350, 330, 160/370.21, 123, 126, 349.1, 370.23, DIG. 2, DIG. 3, DIG. 13; 296/138, 139, 140, 141, 145, 97.7; 16/87.2

[56] References Cited

U.S. PATENT DOCUMENTS

| | | | |
|---|---|---|---|
| 906,132 | 12/1908 | Hansen et al. | 16/87.2 |
| 1,112,950 | 10/1914 | Vaughan | 16/87.2 |
| 2,551,052 | 5/1951 | Quish et al. | 160/370.21 |
| 2,793,050 | 5/1957 | Cook | 296/138 |
| 2,972,377 | 2/1961 | Jacobs | 160/370.21 X |
| 3,400,750 | 9/1968 | Smarker | 160/370.21 |
| 3,861,738 | 1/1975 | Whitney | 296/138 |
| 4,109,957 | 8/1978 | Polizzi et al. | 296/95 |
| 4,560,245 | 12/1985 | Sarver | 296/95 |
| 4,647,102 | 3/1987 | Ebrahimzadeh | 296/97 |
| 4,893,668 | 1/1990 | Nomura | 160/370.21 X |
| 5,165,748 | 11/1992 | O'Connor | 160/370.23 X |
| 5,465,776 | 11/1995 | Mirza | 160/368.1 |
| 5,509,713 | 4/1996 | Hou | 160/370.21 X |

*Primary Examiner*—David M. Purol
*Attorney, Agent, or Firm*—Steins & Associates

[57] ABSTRACT

An Improved Vehicle Curtain is disclosed. The curtain system is installable with suction cups to the windshield or other vehicle window, and further includes a telescoping suspension member for hanging the flexible sheet from during use, and wrapping the flexible sheet around when stowing the sheet. The flexible sheet might also be stowed by wrapping around a sun visor. The suspension member is attached to the window via a pair of a variety of mounting assemblies configured to fit virtually every window configuration. The curtain system also includes support brackets for insertion at the door post trim pieces such that the suspension member might be extended fully around the perimeter of the vehicle and that flexible sheets might be used to cover all windows. The support brackets permit the user to cover side windows that roll down without interfering with the rolling down and up of the side windows.

15 Claims, 9 Drawing Sheets

VEHICLE CURTAIN

BACKGROUND OF THE INVENTION

1. Field of the Invention

This invention relates generally to window covering systems and, more specifically, to an Improved Vehicle Curtain.

2. Description of Related Art

It is known that parked vehicles with the windows closed will build up intense amounts of heat inside when the sun is out. These intensely hot conditions are dangerous to persons entering the vehicle, and are destructive to the seats and other furnishings within the passenger compartment. Furthermore, many vehicle owners would desire privacy inside their vehicle as long as the means for obtaining this privacy were convenient to use. To solve these problems many types of windshield curtains and covers have evolved. We shall look at four pertinent devices in particular.

Sarver, U.S. Pat. No. 4,560,245 discloses a "vehicle windshield curtain for inhibiting heat transfer." The Sarver device is, essentially, a heat transfer-inhibiting curtain that attaches to the windshield of a vehicle by hook-and-loop fasteners. When the curtain is taken down from the windshield, it is left laying on the dashboard or is bundled up and put elsewhere in the vehicle.

There are three significant problems with the Sarver curtain system: (1) the user must glue or otherwise permanently attach hook-and-loop fasteners to the top and bottom of the windshield before the curtain can be hung; and (2) the curtain is not easily stowed when not in use—a curtain laying on the dashboard will prevent the defrost vents from being used to defog the windshield. Furthermore, sticking it under the seat or in some other place in the passenger compartment simply takes up too much space and makes it difficult to install when desired. What is needed is a curtain system that installs over a vehicle's windshield or other window quickly and easily, and can be stowed at the window itself so that no additional space in the vehicle is taken. Furthermore, it would be preferred if no permanent mounting system were required so that the system could be removed from the vehicle or other installation when the vehicle is sold. Also, the Sarver system cannot be used to cover the side windows of the vehicle.

Polizzi et al., U.S. Pat. No. 4,109,957 discloses a "quickly removable windshield curtain" that is, essentially, a curtain that is affixed to the windshield by a plurality of suction cup-type and hook-and-loop type mounting devices. The Polizzi device suffers from the identical problems that the Sarver system has, in that it requires permanent installation and does not permit the user to stow the curtain at the windshield without interfering with the dashboard, etc.

Ebrahimzadeh, U.S. Pat. No. 4,647,102 is a "windshield curtain" that consists of a vertically pleated curtain that is held to the windshield on one end by suction cup-type fasteners: the opposing end is then stretched horizontally across the windshield and attached to the other side of the windshield with more suction cup-type fasteners. When not in use, the Ebrahimzadeh curtain is released from one set of fasteners and stowed at the other fastening point via a strap.

While the Ebrahimzadch system does solve both of the aforementioned problems of the Sarver and Polizzi devices, it creates another problem. The Ebrahimzadeh system mandates a stiff, pleated curtain; while this may be fine on some windshields, it is not very flexible in its application. Windshields and other vehicle windows come in a variety of shapes and sizes and also have a variety of other apparatus surrounding them, such as rear view mirrors. The Ebrahimzadeh requires different sized curtain heights and possibly shapes in order that it be installable in all different types of vehicles. This is not commercially feasible. What is needed is a curtain system that is "one-size-fits-all", in that a single type of system can be installed on a wide variety of surfaces, shapes and configurations.

Mirza. U.S. Pat. No. 5,465,776 is another curtain for vehicle windows that comprises an elastic cord suspended from a pair of suction cup members stuck to the window. While the Mirza system is collapsible and easily stored, it suffers from two other problems: (1) since the cord is suspended from the window, it is limited in its utility for covering side windows, since the side windows usually roll up and down (one would need to continually re-position the suction cups; and (2) since the cord is elastic and has no rigidity, it will sag in between the pair of suction cup members, making it unsatisfactory for wide span windows.

SUMMARY OF THE INVENTION

In light of the aforementioned problems associated with the prior devices, it is an object of the present invention to provide an Improved Vehicle Curtain. It is an object that the curtain system be installable with suction cups to the windshield or other vehicle window, and further include a telescoping suspension member for hanging the flexible sheet from during use, and wrapping the flexible sheet around when stowing the sheet. It is a further object that the suspension member be attached to the window via a variety of mounting assemblies configured to fit virtually every window configuration. It is a still further object that the present curtain system include support brackets for insertion at the door post trim pieces such that the suspension member might be extended fully around the perimeter of the vehicle so that flexible sheets might be used to cover all windows. It is an object that these support brackets permit the user to cover side windows that roll down without interfering with the rolling down of the windows.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an Improved Vehicle Curtain.

Figure 1:
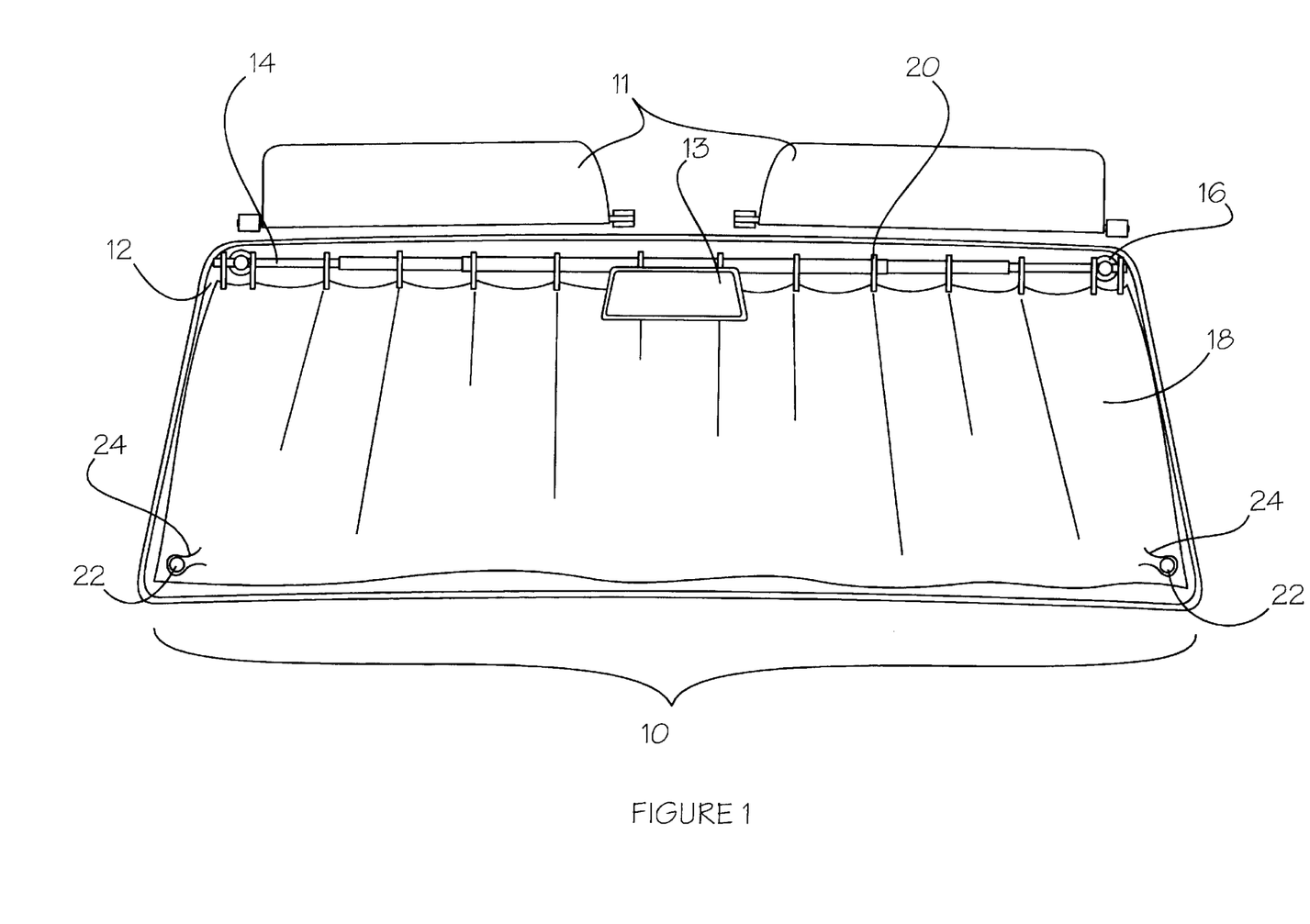
FIG. 1 is a front view of a preferred curtain assembly of the present invention as it might be installed on a typical vehicle.

The present invention can best be understood by initial consideration of FIG. 1. FIG. 1 is a front view of a preferred curtain assembly 10 of the present invention as it might be installed on a typical vehicle's windshield 12. For the purpose of orientation, the sun visors 11 and mirror 13 are also shown. It should be appreciated that while the present invention is depicted as being installed over a vehicle windshield, it is certainly intended to be installable on any type of window or surface where a curtain covering is desirable.

In the typical curtain assembly 10 of the present embodiment, there is a suspension member 14 that extends between a pair of mounting assemblies 16. The mounting assemblies 16 are attached to the window 12, as is described in further detail below. A flexible sheet 18, such as from thin metal, cloth or plastic, hangs from the suspension member 14 from a plurality of suspension loops 20. The suspension loops 20 may be similar to conventional shower curtain loops or the like, but they might also be clips, rings or trolleys. The pertinent aspect of the suspension loops 20 or the like is that they be slidable along the length of the suspension member 14, such that the flexible sheet 18 might be drawn to one side or the other. In some circumstances, it will be desired that the flexible sheet 18 be held taut across the windshield 12. For such a purpose, a pair of tensioning means 22 might be provided. The tensioning means 22 for keeping the sheet 18 taut may be simply suction cups stuck to the windshield 12, which are then attached to the sheet 18 in some fashion, such as by clips 24. The tensioning means 22 may also be attachable and detachable to the sheet 18, so that a user might be able to locate the optimum positions for the tensioning means 22 by trial-and-error.

Figure 2A:
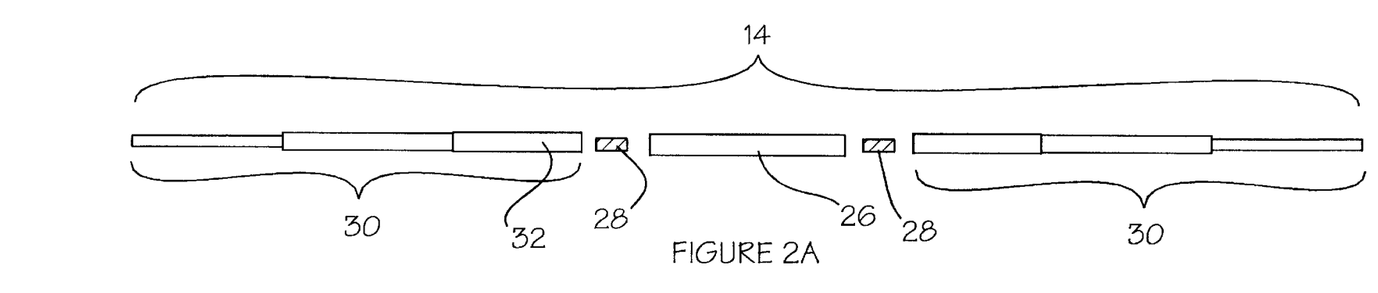
FIGS. 2A, 2B and 2C are exploded front views of preferred suspension member of the assemblies of FIG. 1.

Now turning to FIG. 2A one might gain a better appreciation of the suspension member 14 of the present invention. FIG. 2 is an exploded front view of a preferred suspension member 14 of the curtain assembly 10 of FIG. 1. The suspension member 14 is preferably constructed from a thin, lightweight, strong and yet somewhat bendable material. The bendability is preferred so that the member 14 may be contoured around a mirror (see FIG. 1 ), if necessary. In its preferred form the suspension member 14 comprises a substantially rigid center section 26, into which a pair of connecting elements 28 are inserted or threaded. Extending from each connecting element 28 is a distal section 30. In their preferred forms, the distal sections 30 comprise two or more segments 32 that overlap one another similar to a portable radio antenna. In such a form, the distal sections 30 are telescoping to provide various different lengths in order to fit a maximum variety of window configurations. In certain configurations, the user may desire to use only a single distal section 30, such as where a narrow-width window is involved; for such a reason, the distal sections 30 may be detachable.

Figure 2B:
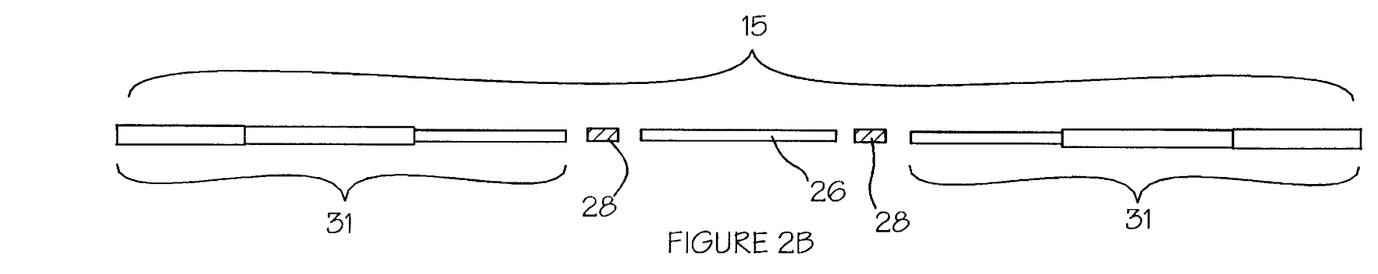

FIG. 2B depicts another preferred suspension member 15. In this version the alternative distal sections 31 are very similar to the distal sections 30 of FIG. 2A with the smaller-diameter segments being attached to the center section 26 by the connecting members 28.

Figure 2C:
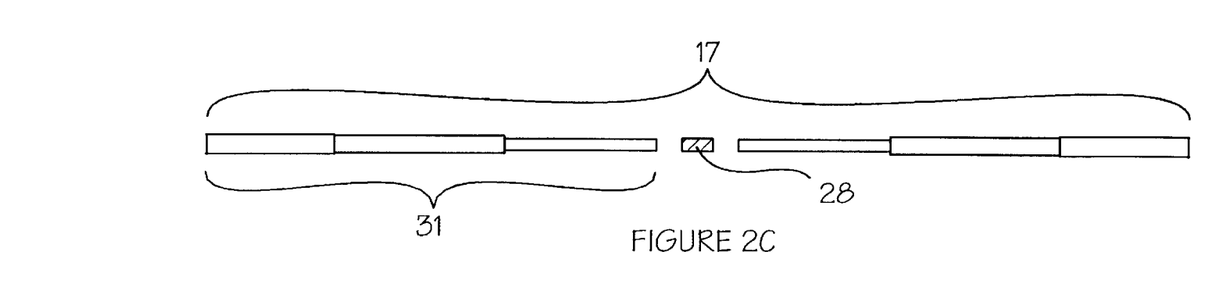

FIG. 2C shows yet another preferred suspension member 17, which eliminates the center section (see FIGS. 2A and 2B). In this version, the alternative distal sections 31 are attached directly to one another by a connecting member 28. It should also be appreciated that a pair of distal sections 30 may be exchanged for one or both alternative distal sections 31.

Figure 3:
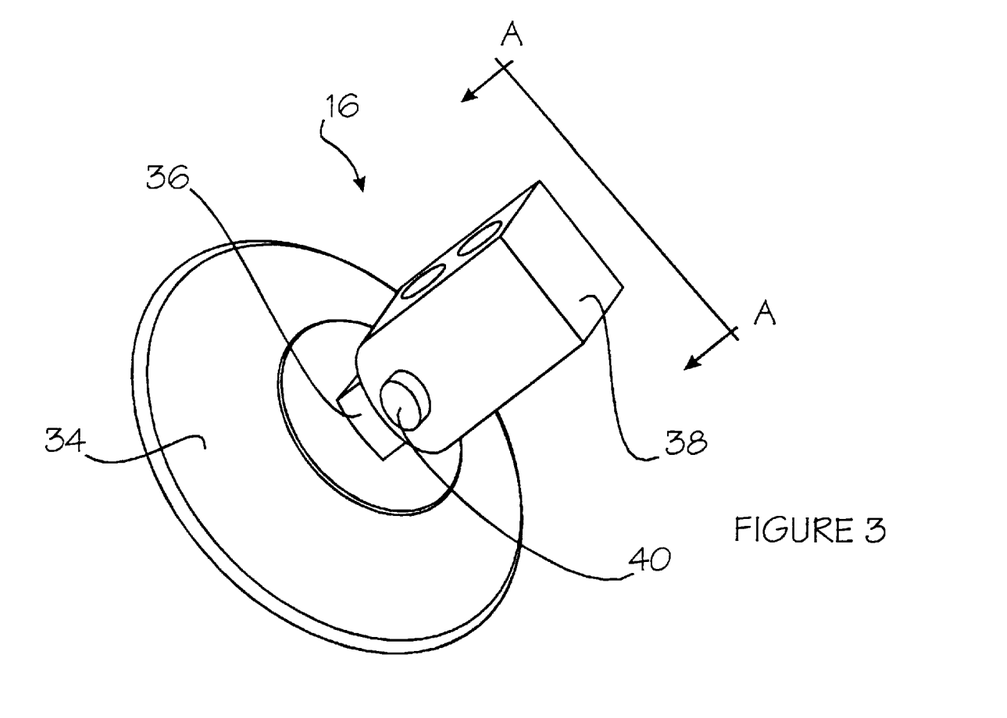
FIG. 3 is a perspective view of a preferred mounting assembly of the assembly of FIG. 1.

FIG. 3 is a perspective view of a preferred mounting assembly 16 of the assembly of FIG. 1, provide to give more detail regarding this unique system. As can be seen, the mounting assembly 16 may comprise a base 34 which is configured to be attachable to the window or other surface. In the depicted view, the base 34 comprises a suction cup, however other designs may be preferred, such as a flat base 34 that is attached to the window or other surface with an adhesive.

Extending upwardly from the base 34 is a support means 36. In this embodiment, the support means 36 is simply a protuberance formed on the base to support the retaining member 38. The retaining member 38 is attached to the support means 36 via the pivot means 40 for permitting the retaining member 38 to tilt or pivot in relation to the base 34. In this embodiment, the pivot means 40 is simply a pin inserted through apertures formed in the retaining member 38 and the support means 36.

Figure 4:
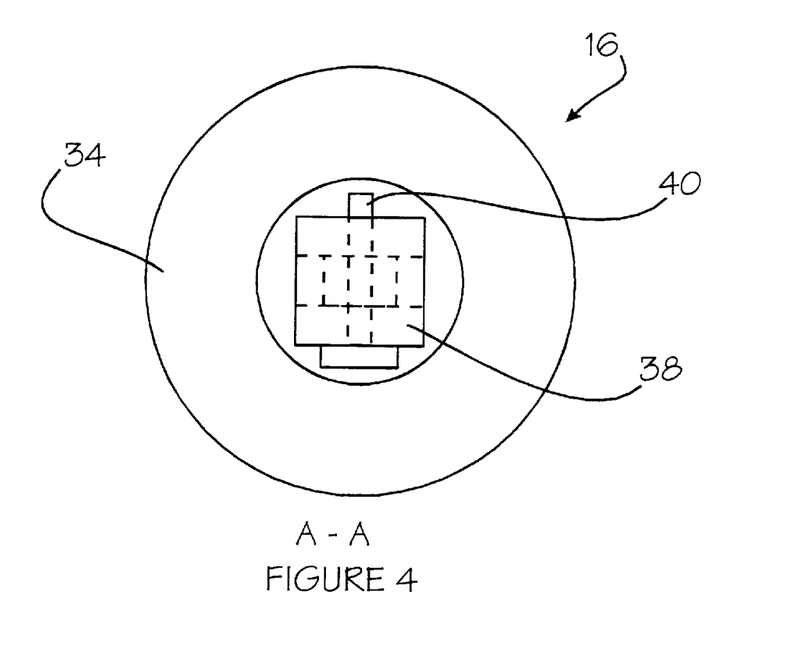
FIG. 4 is a top view of the mounting assembly of FIG. 3.

FIG. 4 is a top view of the mounting assembly 16 of FIG. 3, provided simply to give a better view of the pin-type pivot means 40, and the profile of the retaining, member 38 and base 34.

Figure 5A:
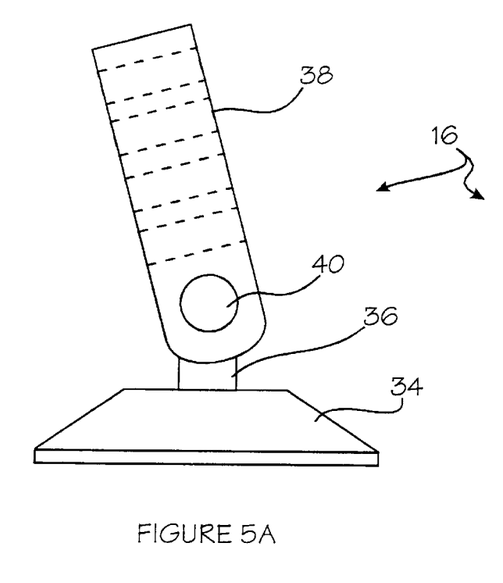
FIGS. 5A and 5B are a pair of side views of the mounting assembly of FIGS. 3 and 4.
Figure 5B:
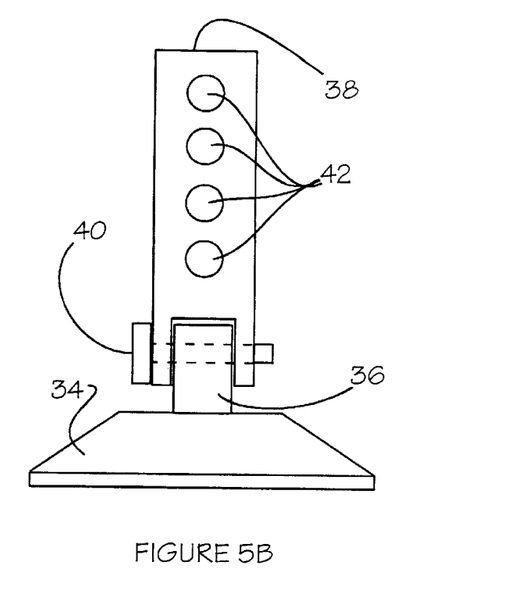

Turning to FIGS. 5A and 5B we might discuss other unique aspects of the present invention. FIGS. 5A and 5B are a pair of side views of the mounting assembly 16 of FIGS. 3 and 4. FIG. 5A simply depicts the retaining member 38 when it is tilted with relation to the base 34. The ability to tilt is critical for the retaining member 38, in order to permit the suspension member (see FIG. 1) to be attached to the retaining members 38 even where the window or windshield is curved.

FIG. 5B depicts a plurality of mounting apertures 42 disposed along the length of the retaining member 38. These apertures 42 are configured to accept the suspension member (see FIG. 1) at its ends. In some cases, however, the suspension member (see FIG. 1) must be set back from the windshield, such as to avoid an obstruction like the mirror (see FIG. 1). The user must simply insert the suspension member (see FIG. 1) in the appropriate mounting aperture 42 to achieve the desired set-back. In other embodiments, this function may be accomplished with a single aperture 42, but where the retaining member 38 has an adjustable length.

Figure 6:
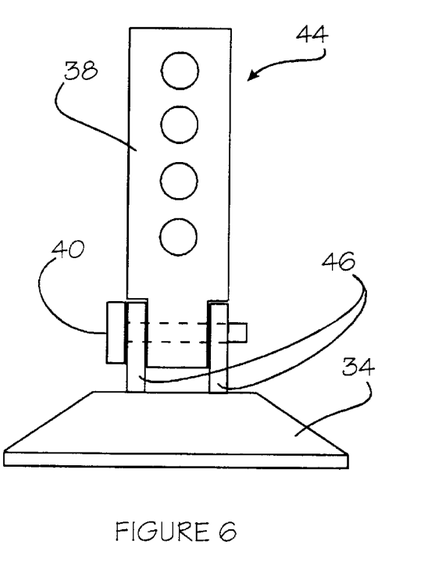
FIG. 6 is a side view of an alternative embodiment of the mounting assembly.

FIGS. 6–9 depict other preferred embodiments of the mounting assembly 16, each of which may be preferred for particular situations installations or manufacturing parameters. FIG. 6 is a side view of an alternate mounting assembly 44. Essentially, this embodiment includes an alternate support means 46 that comprises a pair of upwardly-extending fins. As can be seen, the retaining member 38 is bracketed by the fins and the pivot means 40 is inserted through apertures formed in the support means 46 and the retaining member 38 to permit the retaining member 38 to be tiltable.

Figure 7:
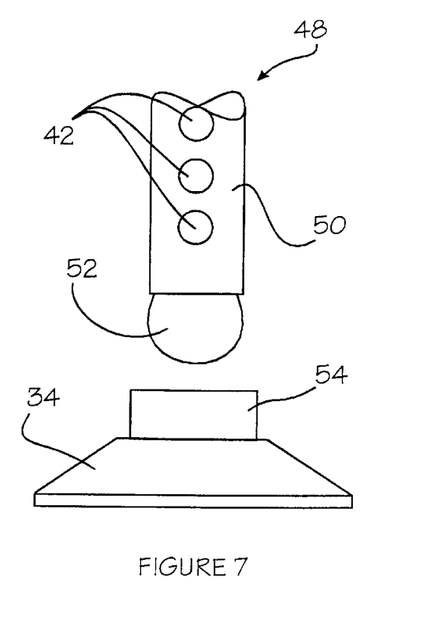
FIG. 7 is a side view of another alternative embodiment of the mounting assembly.

FIG. 7 depicts yet another preferred alternate mounting assembly 48. In this embodiment, the alternate retaining member 50 is formed with an alternate pivot means 52 extending therefrom. The pivot means 52 is a ball-shaped protuberance that is configured to pivot and rotate in the socket-shaped support means 54 that is formed in the base 34. This particular embodiment will permit motion in all axes, for particularly challenging window arrangements.

Figure 8:
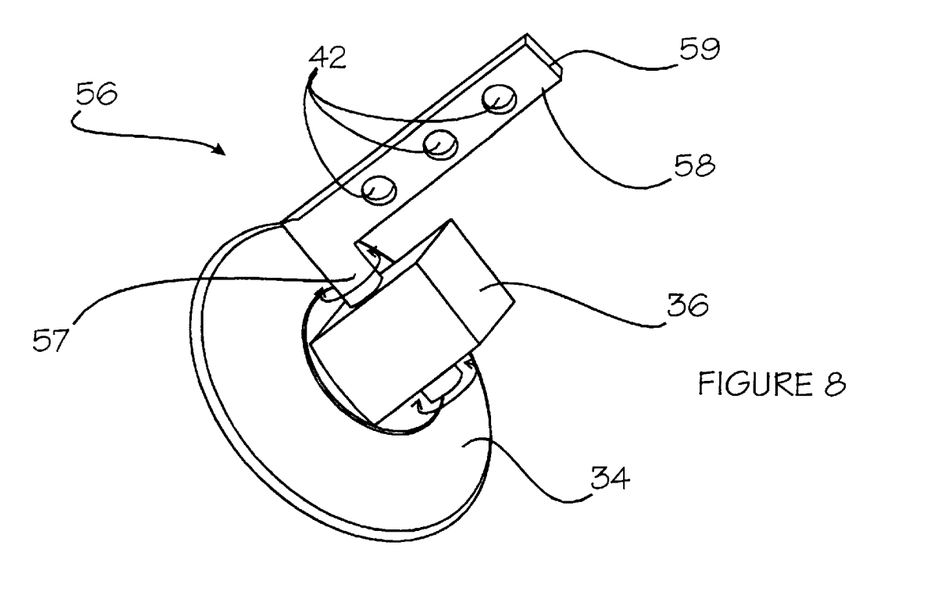
FIG. 8 is a perspective view of another alternative embodiment of the mounting assembly.
Figure 9:
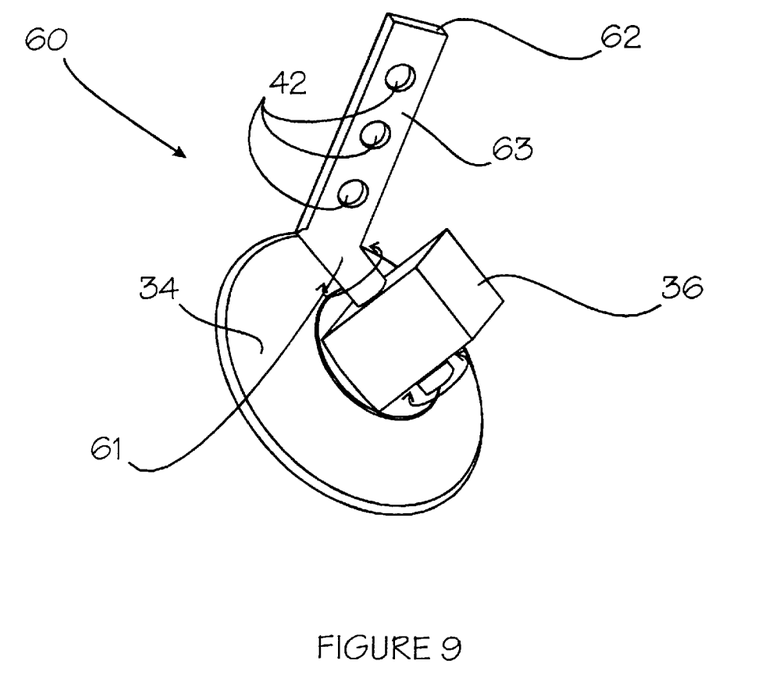
FIG. 9 is a perspective view of another alternative embodiment of the mounting assembly.

FIGS. 8 and 9 depict two additional preferred mounting assemblies 56 and 60. In these embodiments the retaining members 58 and 62 are substantially L-shaped and include an integral pivot means provided by the rods 57 and 61 extending perpendicularly through an aperture in the support means 36 to allow the retaining members 58 and 62 to rotate in the direction of the arrows shown. The retaining member 58 in FIG. 8 comprises a bar 59 extending at an angle of 90 degrees to the rod 57, while the retaining member 62 in FIG. 9 comprises a bar 63 extending from the rod 61 at an angle of other than 90 degrees so that the suspension member (see FIGS. 1 and 2) will be substantially horizontal and straight, even on curved windshields.

Figure 10:
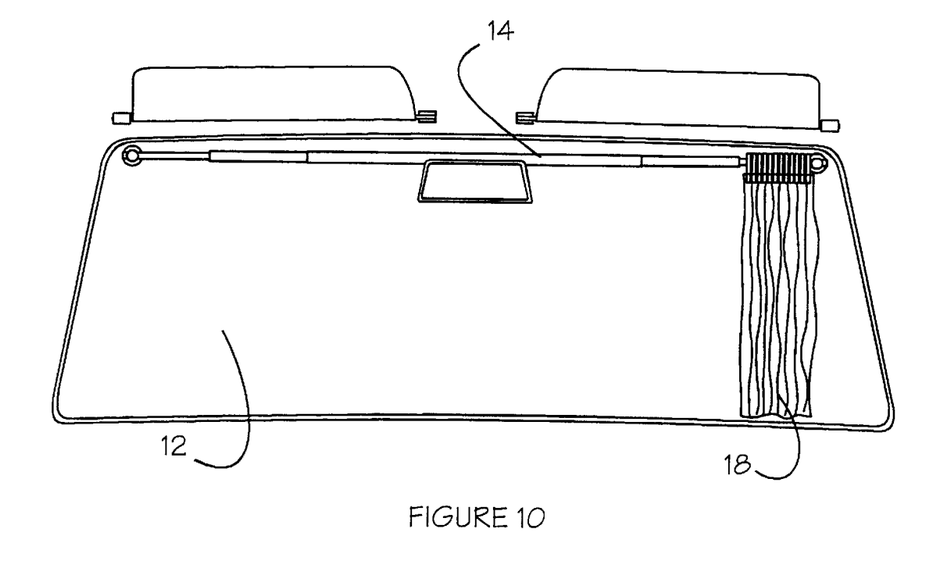
FIG. 10 is a front view of the assembly of FIG. 1 with the curtain partially stowed.
Figure 11:
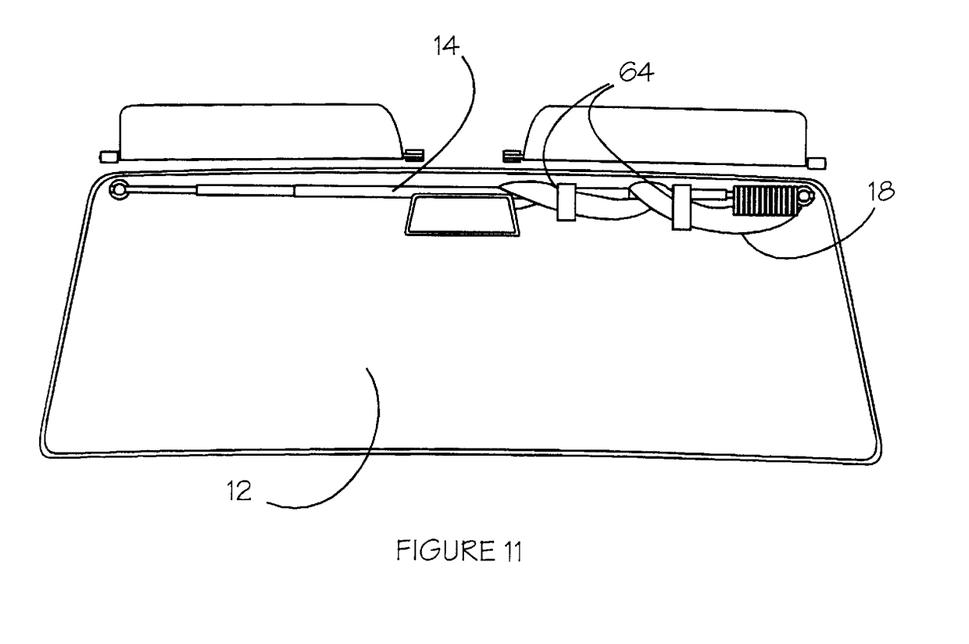
FIG. 11 is a front view of the assembly of FIGS. 1 and 10 with the curtain stowed.

FIGS. 10 and 11 depict the novel method for stowing the flexible sheet 18. Step 1 involves sliding the sheet 18 either to the right or left of the window 12. Once bundled together as shown in FIG. 11, the sheet 18 can be wrapped around the suspension member 14 as shown. As can be appreciated, the sheet 18 is completely out of the way of the window 12 when it is stowed. The system may also include an elastic band or the like (not shown) that could be used to fasten the sheet 18 to the suspension member 14. This removes the need for the user to remove the suspension member 14 from the window 12 when it is not in use. If, however, the user desires to remove the entire system, he or she must simply detach the mounting assemblies (see FIG. 1) from the window 12, and then collapse the suspension member 14. Alternatively if the adhesive-type mounting assemblies (see FIG. 1) are in use, the suspension member 14 need simply be detached from them and then stowed with the flexible sheet 18.

Figure 12:
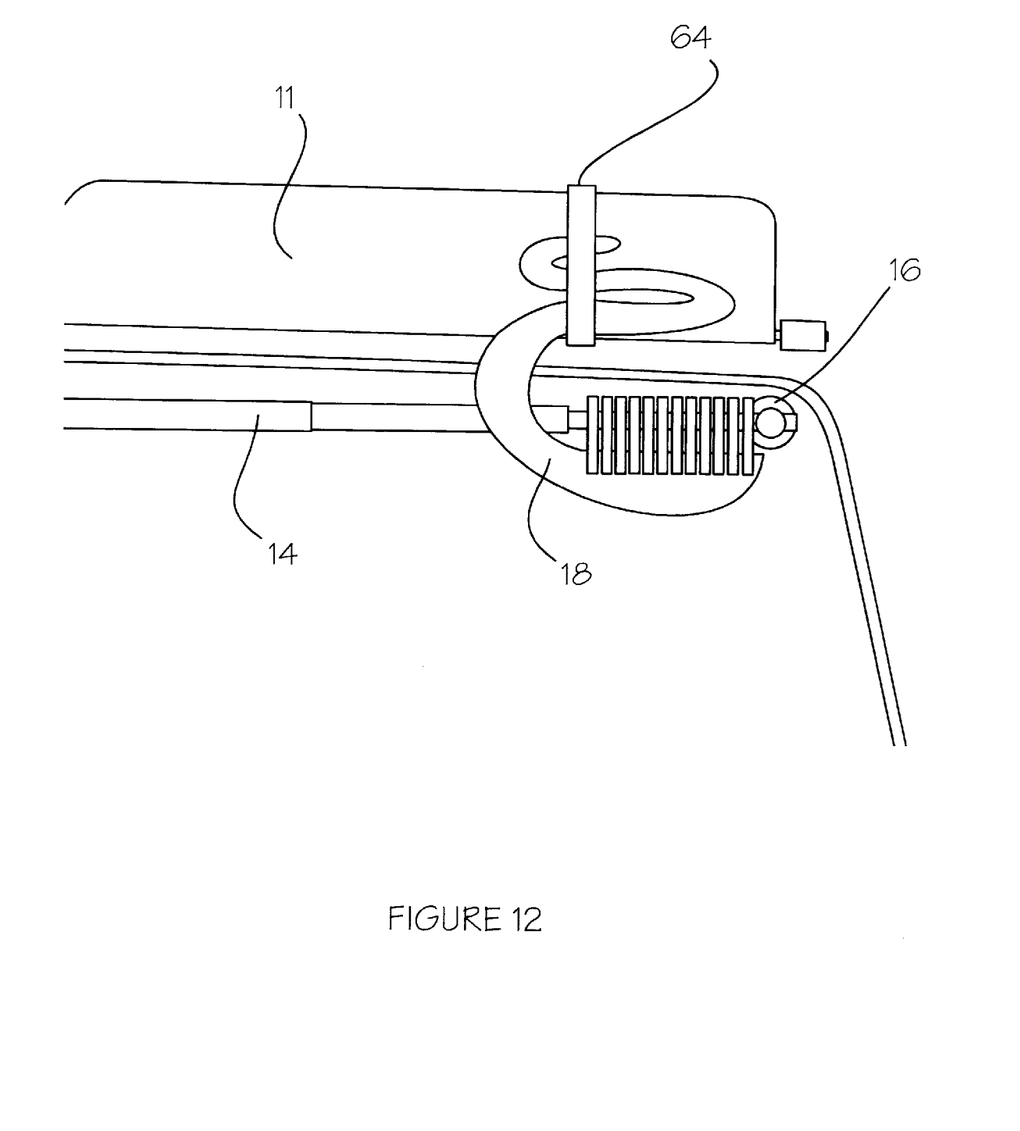
FIG. 12 is a partial front view of the assembly of FIGS. 1 and 10 depicting, the curtain stowed on the sun visor.

FIG. 12 depicts another means for stowing the sheet 18 when the system is not in use. FIG. 12 is a partial front view of the assembly of FIGS. 1 and 10, depicting the curtain stowed on the sun visor 11. In this embodiment, the user merely installs an elasticized band 64 around the sun visor 11, and then feeds the flexible sheet 18 through it after bunching the sheet 18 up at one side of the window, without affecting the mobility of the sun visors 11.

Figures 13A, 13B:
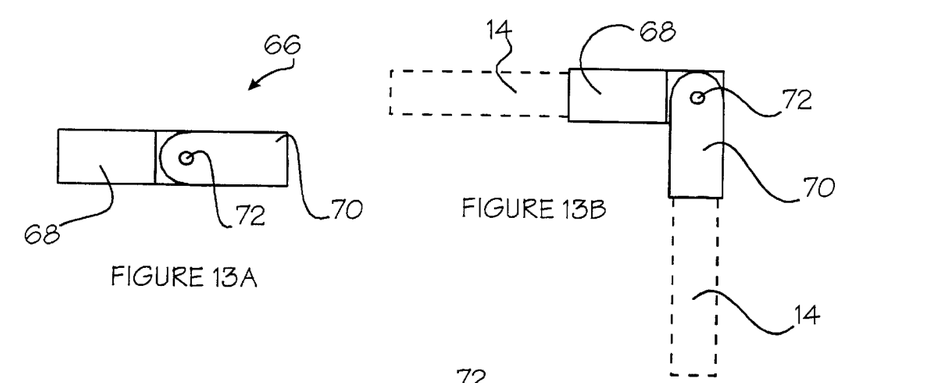
FIGS. 13A, 13B and 13C are tops top and side views of a preferred joint assembly of the present invention.
Figure 13C:
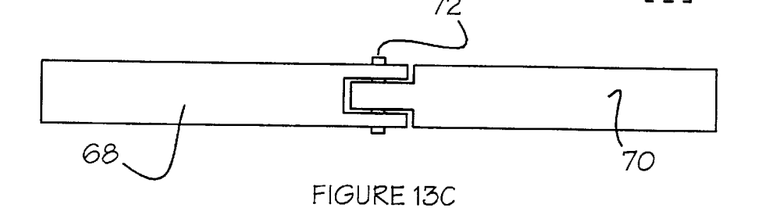

FIGS. 13A, B and C provide detail in regard another heretofore unknown benefit. The present invention may be configured to wrap around the interior of the vehicle; in essence, extending the suspension member (see FIGS. 1 and 2) such that it is continuously extendible to mount over the side and/or rear windows of the vehicle without the need for additional mounting assemblies. The joint assembly 66 permits the suspension member 14 to make the corners around the vehicle. FIG. 13A shows a top view of one preferred joint assembly 66, which comprises a pair of receiving links 68 and 70, which are configured to receive the ends of two suspension members (see FIG. 13B). The receiving links 68 and 70 are hinged at their attachment point, such as by the hinge pin 72. FIG. 13B shows the joint assembly 66 of FIG. 13A where the joint assembly 66 is bent to permit two suspension members 14 to be connected to one another while at right angles to one another. FIG. 13C is a side view of the joint assembly 66 of FIGS. 13A and 13B showing a preferred arrangement of its components.

Figure 14:
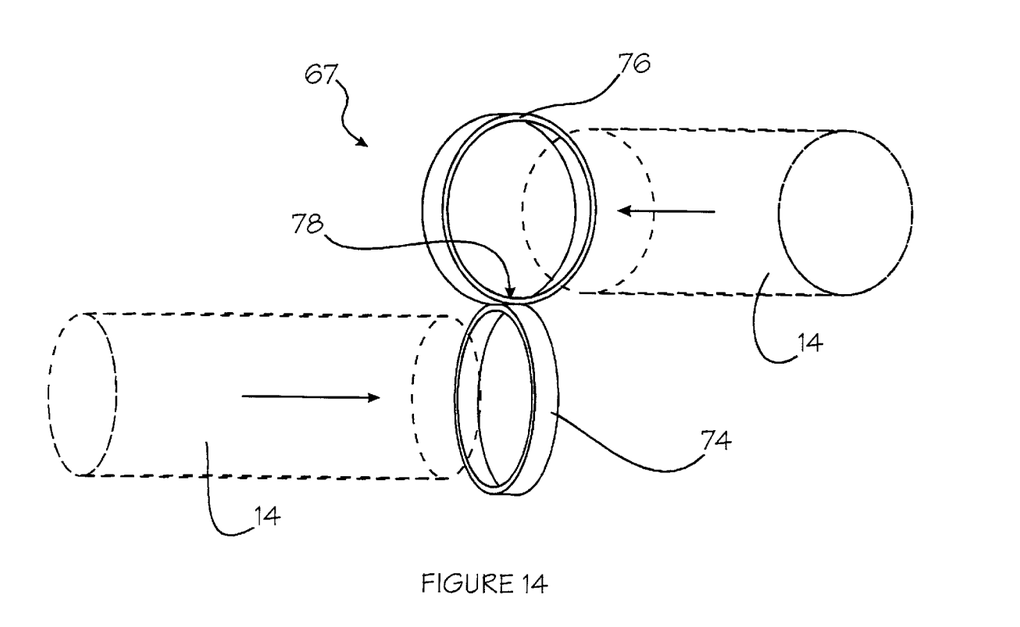
FIG. 14 is a perspective view of another preferred joint assembly of the present invention.

FIG. 14 depicts another preferred joint assembly 67. In this embodiment, a pair of rings 74 and 76 comprise the receiving links. The two rings 74 and 76 are preferably attached to one another by a riveted or bolted hinge pin 78. As can be seen, this arrangement permits the two suspension members 14 to be at an angle to one another.

Figure 15:
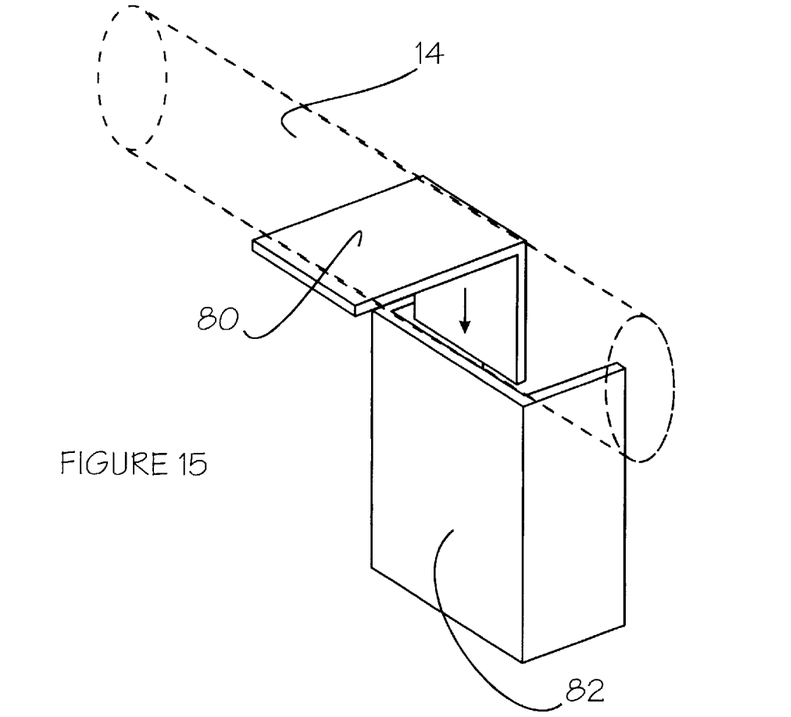
FIG. 15 is a perspective view of a preferred support bracket of the present invention.
Figure 16:
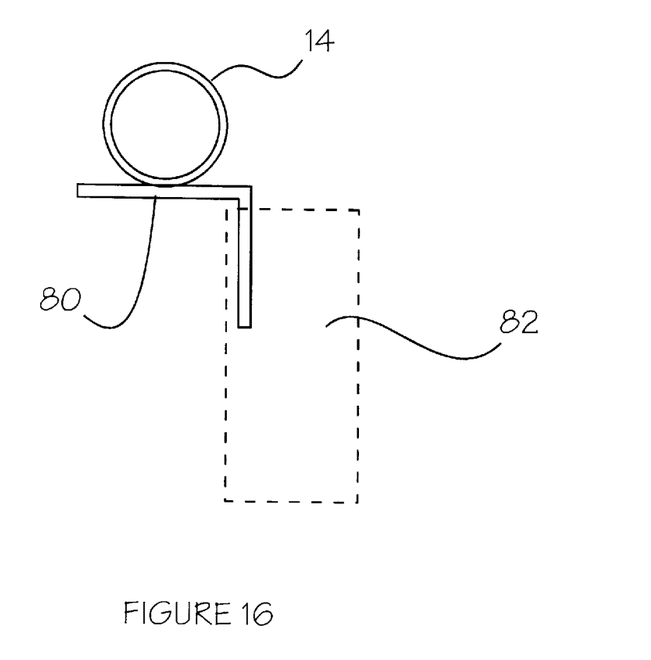
FIG. 16 is a side view of the support bracket of FIG. 15.

FIGS. 15 and 16 show yet another novel feature of the present invention. In situations where side windows of a vehicle are to be covered, additional support of the suspension member 14 might be desired at some mid-point between its ends. Such support may be afforded by a support bracket 80 that is hung from the door post trim piece 82 that covers the structural door post on contemporary 4-door vehicles. One would only need to slip the support bracket 80 over the top of the door post trim piece 82 where the trim piece 82 meets the headliner (i.e. at the edge of the ceiling of the vehicle). Once installed, the support member 14 could rest on the support bracket 80. FIG. 16 merely depicts a side view of the support bracket 80 of FIG. 15 as it might be installed behind a common door post trim piece 82.

Those skilled in the art will appreciate that various adaptations and modifications of the just-described preferred embodiment can be configured without departing from the scope and spirit of the invention. Therefore it is to be understood that, within the scope of the appended claims the invention may be practiced other than as specifically described herein.

What is claimed is:

1. A curtain system for vehicle windows, comprising:

a suspension member comprising a center section and at least one distal section comprising telescopic segments, said distal section removably connected to said center section by a connecting element;

at least two mounting assemblies, said assemblies attaching said suspension member to a window, and further comprising a base, said base being attachable to the window, and a tiltable retaining member extending from said base and further including a plurality of mounting apertures disposed across said retaining member for receiving said support member, said suspension member being attachable to said retaining member by insertion into said mounting apertures;

pivot means associated with said base and said retaining member for permitting said retaining member to pivot in relation to said base;

a flexible sheet extending downwardly from said suspension member by a plurality of suspension loops; and tensioning means for maintaining said sheet in a taut condition.

2. The system of claim 1, wherein said base further comprises a suction cup for attaching to a window.

3. The system of claim 1, wherein said base further comprises adhesive means for adhering to a window.

4. The system of claim 2, wherein said sheet is coilable about said suspension member.

5. The system of claim 4, wherein said mounting assembly further comprises support means extending upwardly from said base to support said retaining member.

6. The system of claim 5, wherein said support means comprises a pair of fins.

7. The system of claim 5, wherein:

said support means comprises a socket; and said pivot means comprises a ball formed on said retaining member and configured to be inserted into said socket.

8. The system of claim 5, wherein said retaining member and said pivot means comprise a substantially L-shaped member.

9. A curtain system for vehicle windows said windows further defined by sun visors, comprising:

a suspension member comprising a center section and at least one distal section comprising telescopic segments, said distal section removably connected to said center section by a connecting element;

at least two mounting assemblies, said assemblies attaching said suspension member to a window, and further comprising a base, said base being attachable to the window, and a tiltable retaining member extending from said base and further including at least two mounting apertures disposed across said retaining member, said suspension member being attachable to said retaining member by insertion into said mounting apertures;

an elasticized band around the sun visor;

a flexible sheet extending downwardly from said suspension member by a plurality of suspension loops, whereby said sheet is further stowable under said band; and tensioning means for maintaining said sheet in a taut condition.

10. The system of claim 9, wherein said base further comprises adhesive means for adhering to a window.

11. The system of claim 9, wherein said sheet is coilable about said suspension member.

12. The system of claim 9, wherein said mounting assembly further comprises support means extending upwardly from said base to support said retaining member.

13. The system of claim 12, wherein said support means comprises a pair of fins.

14. The system of claim 12, wherein:

said support means comprises a socket; and said pivot means comprises a ball formed on said retaining member and configured to be inserted into said socket.

15. The system of claim 12, wherein said retaining member and said pivot means comprise a substantially L-shaped member.

* * * * *